(No Model.) 5 Sheets—Sheet 1.

R. A. BRIGHT.
CIGAR BUNCHING MACHINE.

No. 386,234. Patented July 17, 1888.

Witnesses
Chas. F. Schmelz.
Fred L. Fuller.

Inventor
Richard A. Bright
By his Attorney
S. Scholfield (No Model.) 5 Sheets—Sheet 2.

R. A. BRIGHT.
CIGAR BUNCHING MACHINE.

No. 386,234. Patented July 17, 1888.

Witnesses
Chas. F. Schmelz
Fred L. Fuller

Inventor
Richard A. Bright

By his Attorney
L. Scholfield (No Model.) 5 Sheets—Sheet 3.

R. A. BRIGHT.
CIGAR BUNCHING MACHINE.

No. 386,234. Patented July 17, 1888.

Witnesses
Chas. F. Schmelz
Fred L. Fuller

Inventor
Richard A. Bright
By his Attorney
A. Scholfield (No Model.) 5 Sheets—Sheet 4.

R. A. BRIGHT.
CIGAR BUNCHING MACHINE.

No. 386,234. Patented July 17, 1888.

WITNESSES.
Joseph J. Scholfield
Fred L. Fuller

INVENTOR.
Richard A Bright
per J. Scholfield
Attorney (No Model.) 5 Sheets—Sheet 5.

R. A. BRIGHT.
CIGAR BUNCHING MACHINE.

No. 386,234. Patented July 17, 1888.

Witnesses,
Chas. F. Schmelz.
Fred L. Fuller.

Inventor.
Richard A. Bright.
By his Attorney
S. Scholfield.

UNITED STATES PATENT OFFICE.

RICHARD A. BRIGHT, OF PROVIDENCE, RHODE ISLAND, ASSIGNOR TO WALTER A. PECK, TRUSTEE, OF SAME PLACE.

CIGAR-BUNCHING MACHINE.

SPECIFICATION forming part of Letters Patent No. 386,234, dated July 17, 1888.

Application filed November 18, 1887. Serial No. 255,554. (No model.)

*To all whom it may concern:*

Be it known that I, RICHARD A. BRIGHT, a citizen of the United States, residing at Providence, in the State of Rhode Island, have invented a new and useful Improvement in Cigar-Bunching Machines, of which the following is a specification.

Heretofore in making cigar-bunches by automatic machinery it has been very difficult to obtain the bunch-fillers of uniform quantity or compactness in the measuring-chamber, owing to the uncertainty of stopping the action of the feeding device at the precise point required; and the object of my invention is to secure greater uniformity and precision than heretofore in measuring the proper quantity of loose tobacco to make a bunch filler, and also to roll the binder onto the measured filler under a gradually-increasing pressure, thus forming a compact smooth bunch which is better adapted than an ordinary loose bunch to receive its final wrapper in a cigar-wrapping machine; and my invention consists in a feeding-roll or other device for feeding the tobacco into the filler-measuring chamber, with a friction-clutch for transmitting a positive movement to the said feeding device, the measuring-chamber being provided with a yielding presser from which operative connection is made with a stop, which at the complete measurement of the filler is adapted to cause the instant stopping of the movement of the feeding device and the consequent slipping of the friction-clutch which serves to impart the said movement, and, also, with mechanism for causing the release of the feeding device from the action of the said stop preparatory to the feeding forward of the loose tobacco into the measuring-chamber to form a new bunch-filler, and mechanism for automatically discharging the measured filler into the belt-pocket for rolling on the binder.

It also consists in an improved mechanism for operating the belt which serves to form the receiving-pocket for rolling on the binder, and an improved carrier mechanism for discharging the finished bunch from the machine.

In the accompanying drawings, A is the frame of the machine.

Figure 6:
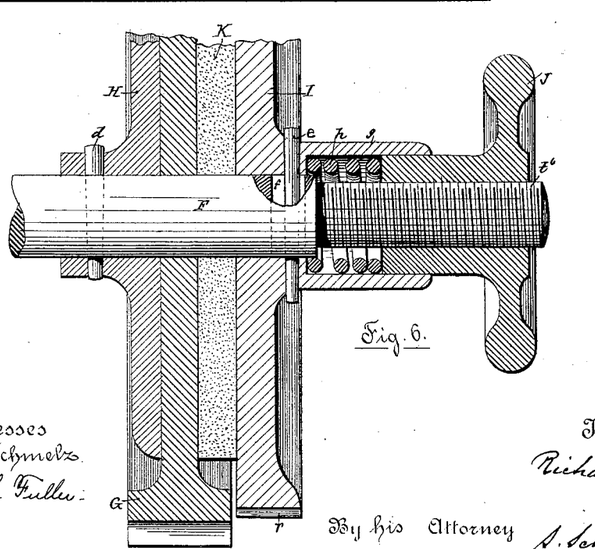
Fig. 6 is a detail section showing the friction-clutch through which power is transmitted to the feeding-roll.

B is the feed-bed, serving to support the endless feed-belt C, which delivers the tobacco laid thereon to the feeding-roll D, the said feeding-roll being provided at its periphery with the spurs $a\,a$, which serve to receive the loose tobacco from the belt C and force the same into the throat-passage E, the upper plate, $b$, of which is provided with comb-like teeth $c$, between which the spurs $a$ of the roll D are made to rise from the throat-passage E, so that the tobacco will be properly shed from the said spurs and forced through the said throat-passage. The feeding-roll D is keyed to the shaft F, at the outer end of which is placed the frictionally-held gear-wheel G, Fig. 6, which is loose on the shaft F, and is held between the disk H, which is firmly secured to the shaft F by means of the pin $d$, and the opposite disk, I, which is secured to the shaft by means of the pin $e$, which enters the diametrical slot $f$ in the said shaft, the said disk I being provided at its periphery with the ratchet-teeth $r$, which upon engagement with a stop-pawl will serve to stop the rotary movement of the feeding-roll D. The hub $g$ of the disk I is chambered to receive the spring $h$, the tension of which is adjusted by means of the wheel-nut J, which screws upon the threaded portion $t^6$ of the shaft F.

Between the fixed disk H and the movable disk I, upon the shaft F, and at one or both sides of the gear-wheel G, is placed a leather friction-washer, K, and the friction-clutch thus formed is to be so adjusted as to transmit sufficient power to positively drive the feeding-roll D. The gear G is continuously driven from the cam shaft O by means of the gear-wheel P, securely keyed to the said shaft and the intermediate gear-wheel, $q$, and the shaft O is continuously driven from the driving-shaft Q by means of the pinion S, which engages with the said gear P.

Figure 3:
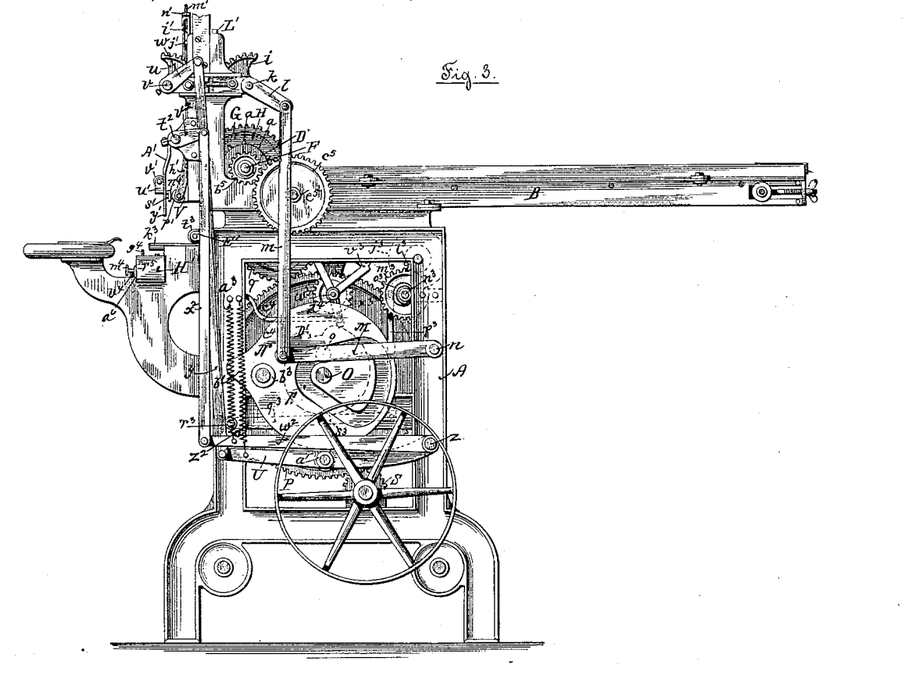
Fig. 3 is an opposite side elevation, with a slight portion of the upper frame-work broken away.
Figure 4:
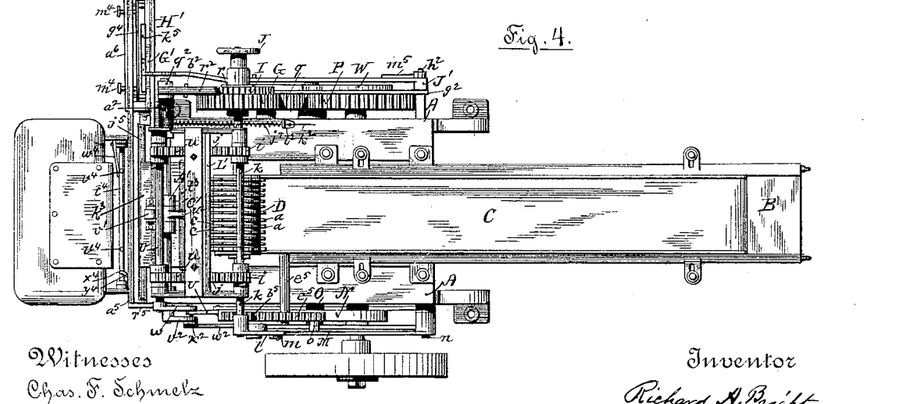
Fig. 4 is a plan view.

The knife or gate L, which serves to separate the fillers to form the bunch, is held by a slide, L', which is made to move up and down in suitable grooves in the frame of the machine by means of the segment-gear $i$ and the rack $j$, a gear and rack being preferably employed at each end of the slide L' in order to carry the knife in a true line without danger of cramping the slide in the guiding-grooves. The segment-gears $i$ $i$ are secured by means of suitable pins or set screws to the shaft $k$, upon the outer end of which is securely fastened the arm $l$, and from the outer end of the arm $l$ connection is made to the pivoted lever M by means of the connecting-bar $m$. The lever M is pivoted to the frame A at the point $n$, and provided with a pin or roller, $o$, which enters the groove $p$ of the cam N, (see Fig. 3,) the said cam being located at the outer end of the cam-shaft O.

In front of the knife-slide L' is placed the slide T, which is provided at each end with a rack, $t$, which engages with a segment-gear, $u$, securely pinned or fastened to each end of the shaft $v$. At the outer end of the shaft $v$ is also fastened the arm $w$, from which connection is made to the pivoted lever U by means of the connecting-bar $y$, the said lever being pivoted to the frame A at the point $z$, and provided with a pin or roller, $a'$, which engages with the projecting cam $b'$, at the periphery of the cam N.

To the downwardly-extending arms $c'$ of the slide T is pivoted the chamber-piece V to an outward ear, $o'$, at one end of which is pivoted the slotted bar $d'$, the slot $e'$ of which embraces the pin or stud $f'$, which projects from the ear-piece $g'$, secured to the side of the slide T, and to the other end of the chamber-piece V, at a projecting ear, $p'$, is pivoted the slotted bar $h'$, the slot $i'$ of which embraces the pin or stud $j'$, which projects from the ear-piece $k'$, secured to a fixed cross-bar, $l'$ at the head of the frame of the machine. The upper end of the slotted bar $h'$ is turned at a right angle and provided with the screw $m'$ and check-nut $n'$, by means of which the proper limit of the up-and-down movement of the slotted bar $h'$, and the consequent movement of the outer portion of the chamber-piece V, can be determined.

Within the measuring-chamber $q'$ of the chamber-piece V is placed the loosely-held yielding presser $r'$, to the back of which are attached the wires $s'$ $s'$, which pass loosely through suitable perforations made in the back $t'$ of the chamber-piece V, and to a cross-piece, $n^6$, connecting the outer ends of the wires $s'$ $s'$, are secured the bracket-pieces $u'$ $u'$, between which is pivoted the connecting-roller $v'$, by means of which operative connection is made with proper mechanism to effect the discharge of the filler from the measuring-chamber into the receiving-pocket of the binding mechanism.

Figure 7:
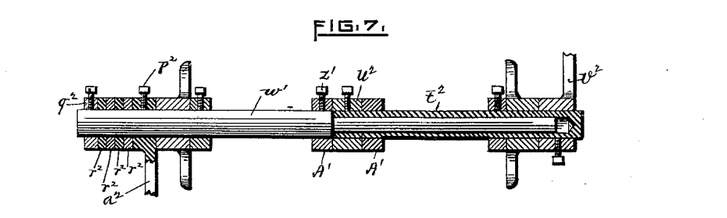
Fig. 7 is a detail section showing the shaft which carries certain parts of the filler measuring and discharging mechanism.
Figure 8:
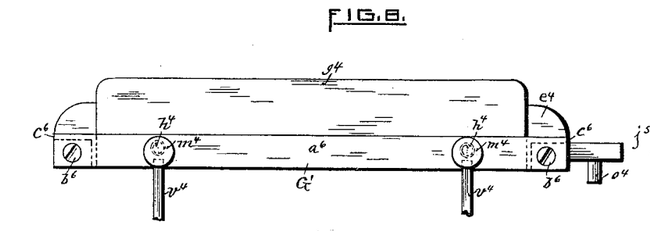
Fig. 8 is a front elevation of the bunch-carrier removed from the machine.

Upon the shaft $w'$, which extends from side to side of the machine, is secured the bifurcated arm A', the prongs $y'$ $y'$ of which bear against the projecting ends of the wire bars $s'$ $s'$, which extend outward from the sliding piece $r'$, the said arm A' being firmly held in its adjusted position upon the said shaft by means of the set-screw $z'$. At the outer end of the shaft $w'$, and by means of the screw $p^2$, Fig. 7, is secured the pendent arm $a^2$, from the lower end of which connection is made to the trip-lever $b^2$, by means of the link $c^2$, the said link being provided with a slot, $d^2$, at its joint with the arm $a^2$, and also made in two parts, which are placed side by side and connected to each other by means of the screw and slot $e^2$, thus making the length of the link $c^2$ adjustable to adapt the machine for forming uniform bunches of different sizes.

The trip-lever $b^2$ is pivoted at the point $f^2$ to the lever $g^2$, which is held upon a stud, $h^2$, projecting from the frame, and is provided with the roller $i^2$, which travels upon the periphery of the cam W. The bifurcated arm A' is held against the outer ends of the wire bars $s'$ $s'$ by means of the tension of the spring $j^2$, which is held upon a rod, $k^2$, passing loosely through a hole or eye in the stand $l^2$, secured to the frame A, and also loosely through a hole made in the knee-piece $m^2$, secured by means of the bolt $n^2$ to the side of the pendent arm $a^2$. The spring $j^2$ is secured at one end to the said stand $l^2$, the opposite end of the spring being secured to the rod $k^2$, upon which it is held, so that the tension of the spring can be increased by screwing up the milled nut $o^2$ at the threaded outer end of the said rod $k^2$. Between the hub of the arm $a^2$ and the collar $q^2$ upon the shaft $w'$ are loosely held the series of pawls $r^2$, which are made of gradually-increasing length in order that instant action may be had at the proper time upon the teeth $r$ of the disk I to stop the feeding-roll D without danger of increased movement, which would tend to cause an undesirable increase in the size of the bunch-filler.

The pawls $r^2$ are each provided at the same distance from their pivot ends with the projection $s^2$, which engages with the upper end of the trip-lever $b^2$, by means of which the pawl is allowed to drop at the proper time to engage with the ratchet-teeth $r$ of the disk I, thus stopping the further movement of the feeding-roll D by causing the driving friction-clutch to slip. A portion of the shaft $w'$ is provided with a loose sleeve, $t^2$, upon the inner end of which is secured the wiper-arm $u^2$, and to the outer end of the sleeve $t^2$ is secured the arm $v^2$, from which operative connection is made to the lever $w^2$ by means of the connecting-bar $x^2$, the said lever $w^2$ being pivoted to the frame A at the stud $z$, and also held up against a limiting-stop, $z^2$, by means of the spring $a^3$. The lever $w^2$ is operated by engagement with the roller $b^3$, secured to the side of the cam N.

Upon the back of the slide T is placed the supplementary slide B', provided with a horn, $c^3$, extending upward at the front of the slide T by passing under the lower edge of the same, the said horn $c^3$ being adapted for engagement with the wiper-arm $u^2$, which serves to cause the delivery of the filler from the measuring-chamber into the receiving-pocket of the binding mechanism. The lower end of the supplementary slide is provided with the circularly-curved guide $d^3$, which serves to form a guide and pocket, $e^3$, for the reception of the roller $v'$, by means of which operative connection is made to the yielding presser $r'$ of the measuring-chamber.

Figures 12, 13:
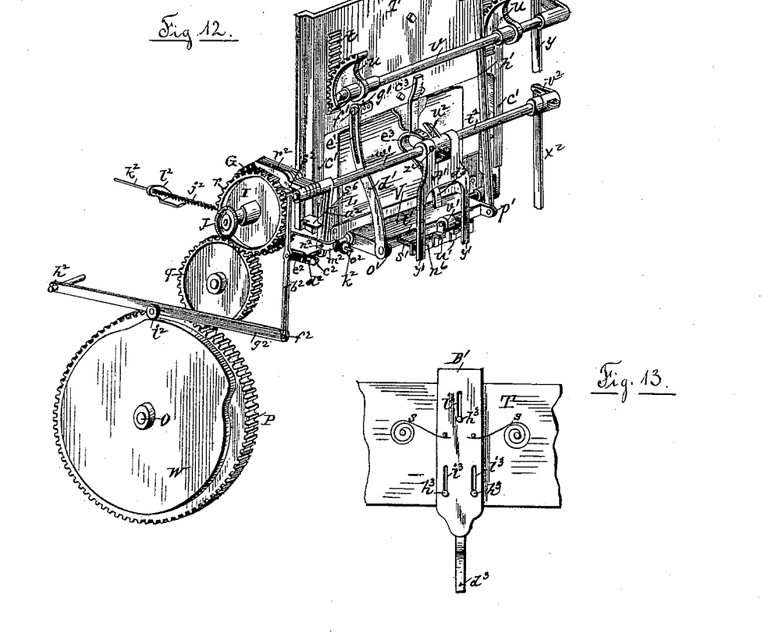
Fig. 12 is a perspective view showing various parts of the filler measuring and discharging mechanism.
Fig. 13 is a detail view showing the supplemental slide which forms a part of the filler-discharging mechanism.

The slide T is held in its elevated position against the stop $f^3$ by means of the spiral springs $g^3$ $g^3$, and the supplementary slide B' is held against the stop formed by the holding-screws $h^3$, Fig. 13, which strike against the lower end of the slots $i^3$ in the said slide by means of the springs $s\ s$.

Immediately under the tobacco feeding and measuring mechanism, above described, is placed the belt C' for rolling the binder upon the measured filler, the said belt being secured at one end to the drum $j^3$, held upon a shaft which is journaled to the frame A, and at the other end to the movable bed $k^3$.

At one end of the drum $j^3$ is secured the gear $l^3$, which engages with the gear $m^3$, revolving loosely upon a fixed stud, $n^3$, and around the said stud $n^3$ is coiled the spring $o^3$, one end of the said spring being attached to the gear $m^3$ and the other end to the frame A, so that, when the said gear has been revolved by suitable means in one direction, the resilience of the said spring will serve to turn the said gear in the reverse direction.

To the side of the gear $m^3$ is pivoted the bar $p^3$, which connects with the lever $q^3$, the said lever being pivoted to the frame A at the point $r^3$, and provided with a pin or roller, $s^3$, which engages with the periphery of the cam D', the spring $o^3$ thus serving to hold the roller $s^3$ in contact with said cam.

Figure 5:
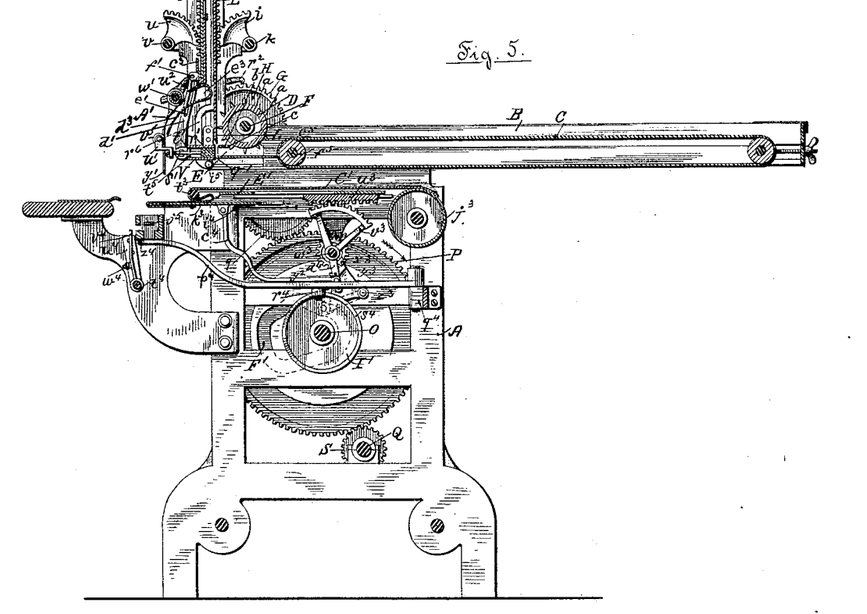
Fig. 5 is a central vertical section.

The roll $t^3$, which serves to carry the pocket of the rolling belt forward to roll the binder upon the bunch-filler, is journaled to a sliding frame, E', provided at its lower side with a rack, $u^3$, which engages with a segment-gear, $v^3$, secured to a shaft, $w^3$, upon which shaft is also secured the pinion $x^3$, which engages with the segment-gear $y^3$, secured to the shaft $z^3$, and upon the shaft $z^3$ is also secured an arm, $a^4$, which is provided at its outer end with a roller, $b^4$, held in the cam-groove F' at the back of the gear P, so that by means of the rotation of the cam in the direction of the arrow in Fig. 5 the proper reciprocating movement will be imparted to the slide E' and roll $t^3$.

From the movable bed $k^3$ connection is made by means of the connecting-rod $c^4$ with the slotted arm $d^4$, which is secured to the shaft $w^3$ at the side of the segment-gear $v^3$ upon the same shaft, so that upon the movement of the roll $t^3$ in one direction a corresponding movement will be simultaneously imparted to the bed $k^3$ in the opposite direction until the said bed $k^3$ strikes the stop-pin $i^4$, thus limiting its backward movement, and thereafter upon the continued forward movement of the roll $t^3$ the end of the connecting-rod $c^4$ will rise in the slot $y^2$ of the arm $d^4$.

When the binder has been rolled upon the filler to form a cigar-bunch, the said cigar-bunch is to be discharged from the rolling-pocket of the belt into a carrier, G', which moves back and forth in a guide, H', the said carrier consisting of a back plate, $e^4$, and projecting slide-ears $f^4$, to which is attached the guiding-plate $a^6$ by means of the screws $b^6$. The slide-ears $f^4$ are each recessed at $c^6$ to fit the slot $d^6$ in the carrier-guide, and to form a shoulder, $e^6$, adapted to guide the carrier by extending above the upper edge of the slot $d^6$, the plate $a^6$ at the outer side of the said slot serving, in conjunction with the said shoulder, to guide the carrier in a true line. Within the inclosed space $g^6$, between the back plate, $e^4$, and the guiding-plate $a^6$, is placed the movable holding-plate $g^4$, provided at it lower outer side with the studs $h^4 h^4$, which pass loosely through perforations in the removable guide-plate $a^6$. The plate $g^4$ is also provided at its lower inner side with the projections $k^4 k^4$, which are perforated to receive the guide-wires $l^4 l^4$, which are attached to the guide-plate $a^6$ and enter corresponding holes in the back plate, $e^4$, and serve to steady the plate $g^4$ in its lateral movement under the action of the springs $j^4 j^4$, which are placed upon the guide-wires $l^4 l^4$ between the said holding-plate $g^4$ and the guide-plate $a^6$, and the forward ends of the projections $k^4$, which strike against the back plate, $e^4$, will serve to properly limit the forward movement of the holding-plate $g^4$ under the action of the said springs. The studs $h^4$ are also provided with the enlarged flat heads $m^4$ for making suitable connection with the upper ends of the arms $v^4 v^4$, by means of which the plate $g^4$ is to be drawn back preparatory to the discharge of the cigar-bunch from the rolling-pocket of the belt into the carrier.

Operative connection is made from the pin $o^4$ at one end of the carrier G' to the cam I' upon the shaft O by means of the lever $p^4$, which is provided with a perforation adapted to receive the said pin $o^4$, which passes downward through the slot $f^6$ in the bottom of the carrier-guide, the said lever being pivoted to the stand $q^4$ and provided with a roller, $r^4$, held in the groove $s^4$ of the said cam.

The rod $t^4$, which is loosely held in the brackets $u^4 u^4$, is provided with the attached upright arms $v^4 v^4$, which are held in a forward position by means of the flat spring $w^4$, secured to the sides of one of the said brackets and resting against the back of one of the arms $v^4$; and the said arms $v^4$ are moved outward against the action of the said spring by means of the arm $x^4$, which is also secured to the rod $t^4$ and so arranged that its upper end, $y^4$, will be brought into engagement with the end $z^4$ of the lever $p^4$ when the carrier G' has been brought to its proper receiving position under the pocket of the belt; and upon the said outward movement of the arms $v^4 v^4$ their upper ends will strike against the inner side of the heads $m^4 m^4$, thus serving to draw back the plate $g^4$ preparatory to the reception of the cigar-bunch from the pocket of the belt. The upper end of the arm $x^4$ may be made to strike against the side $a^5$ of the carrier-guide H', thus forming a stop for the forward movement of the arms $v^4 v^4$ under the action of the spring $w^4$.

Figure 2:
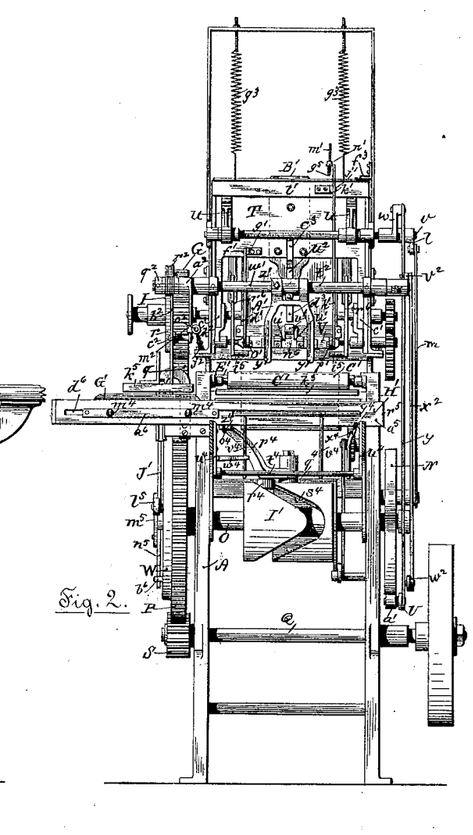
Fig. 2 is a front elevation of the same.
Figure 9:
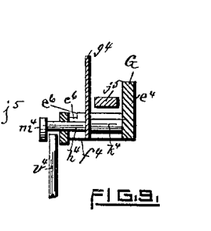
Fig. 9 is a section of the same taken in the line $x\,x$ of Fig. 8, also showing a section of the fixed tongue for supporting the bunch prior to the proper engagement of the pressure-plate of the carrier with the said bunch.
Figure 10:
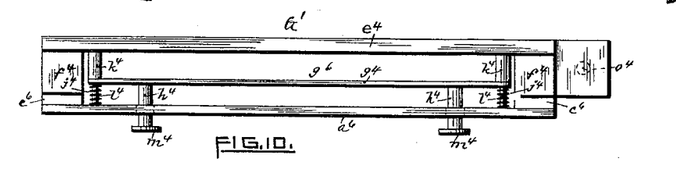
Fig. 10 is a top view of the bunch-carrier.

At the inner side of the end $r^5$ of the carrier-guide H' is secured the stationary flat tongue $j^5$, which, by projecting forward between the plate $g^4$ and the inner side of the carrier, as shown in section, Fig. 9, will serve to support the cigar-bunch until the holding-plate $g^4$ is released from the arms $v^4 v^4$ at the initial movement of the carrier by the action of the cam-groove $s^4$ upon the lever $p^4$, and when the carrier G' has been brought by the action of the said cam and lever to the position shown in Fig. 2 it will be held under the forcer $k^5$, which is attached to the forward end of the bell-crank lever J', the said lever being pivoted to the frame A at the stud $h^2$ and held in an elevated position against the stop-pin $b^6$ by means of the spring $p^5$, the pendent arm $n^5$ of the said bell-crank lever being provided with the attached cam-piece $m^5$, which is adapted for engagement with the roller $l^5$ upon the side of the cam W, and the downward movement of the forcer $k^5$ will serve to force the finished cigar-bunch from the carrier.

Figure 1:
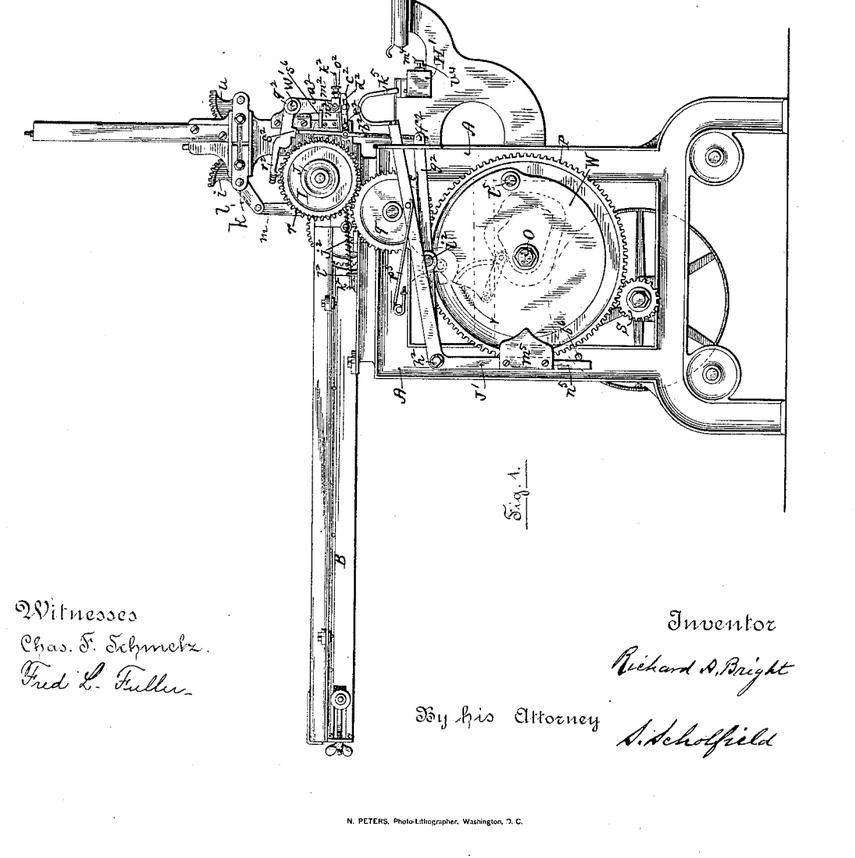
Figure 1 is a side elevation of my improved cigar-bunch machine.
Figure 11:
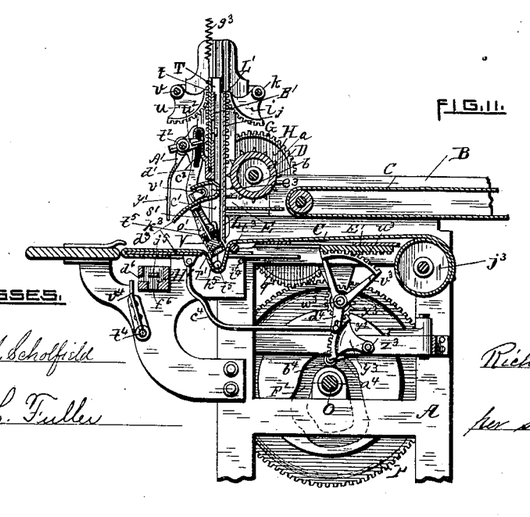
Fig. 11 is a detail vertical section of the machine, showing the measuring-chamber when in the discharging position.
Figure 14:
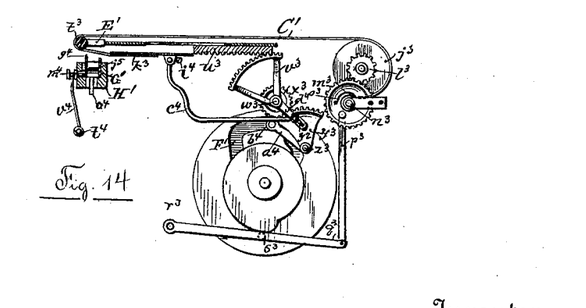
Fig. 14 is a detail section showing the mechanism employed for rolling on the binder.

In operating the machine, the loose tobacco is fed upon the endless belt C, which is driven from the shaft F of the feeding-roll D by means of the gear $b^5$ upon the shaft F and the gear $c^5$ upon the shaft $e^5$ of the driving-roll $f^5$ of the said belt. The loose tobacco passes from the belt C under the feeding-roll D, and is carried in a sheet through the throat-passage E into the measuring-chamber $q'$, thus forcing back the yielding presser $r'$, the projecting wire bars $s' s'$ of which gradually press back the prongs $y' y'$ of the bifurcated arm A' against the action of the adjustable spring $j^2$, the tension of which spring serves to determine the relative compactness of the fillers in the measuring-chamber; and the outward movement of the yielding presser $r'$ and arm A' will continue until the trip-lever $b^2$ is brought from under the projecting portion $s^2$ of the pawls $r^2$ by means of the adjustable link $c^2$ and the arm $a^2$, the said arm being secured to the same shaft $w'$ with the arm A'; and upon the withdrawal of the tripping-lever $b^2$ from the projections $s^2$ the pawls $r^2$ will drop to the teeth $r$ of the disk I, and thus cause the instant stopping of the rotary movement of the feeding-roll and the consequent forward movement of the tobacco into the measuring-chamber; but the gear G, which serves to drive the feeding-roll D, will still be allowed to revolve by means of the slipping-clutch between the said gear and the shaft of the feeding-roll. As soon as the movement of the feeding-roll has been stopped, as above described, the knife or gate L is brought down by means of the cam-groove $p$ of the cam N to cut off the quantity of tobacco in the measuring chamber $q'$, and then a downward movement imparted to the slide T, conjointly with the continued downward movement of the knife or gate, by means of the projecting pointed cam $b'$ at the periphery of the cam N, will cause the initial downward movement of the measuring chamber, as held in a horizontal plane shown in Fig. 5, until the point $g^5$ of the screw $m'$ strikes against the upper edge of the ear-piece $k'$, thus stopping the further downward movement of the outer portion, $t^5$, of the chamber-piece V; and the continued downward movement of the slide T will carry the inner edge of the chamber-piece V downward to the position shown in Fig. 11, in which position the roller $v'$ will be held in the pocket $e^3$ at the lower end of the slide B'; and upon the downward movement of the said slide B' by means of the roller $b^3$ at the side of the cam N, which cam and roller serve to operate the wiper-arm $u^2$, the yielding presser $r'$ at the back of the measuring-chamber $q'$ will be carried downward, thus causing the measured filler to be ejected into the receiving-pocket $h^5$, which is formed in the belt by means of the opposite inwardly-projecting studs $i^5$, which are secured to the pendent arms $r^6 r^6$, attached to the knife-carrying slide, the knife L being also made to accompany the chamber-piece V in its downward movement, so as to prevent the premature dropping of the filler from the measuring-chamber. After the measured filler has been deposited in the receiving-pocket $h^5$ of the belt the continued movement of the machine will serve to bring the several parts of the measuring mechanism back to the position shown in Fig. 5, and then the operation of the cam W upon the lever $g^2$ will cause the trip-lever $b^2$ to be raised under the projections $s^2$ at the under side of the pawls $r^2$, the said trip-lever having been previously drawn downward by means of the said lever $g^2$ and cam W, so that the trip-lever $b^2$ and the connected sliding piece $r'$ will be carried forward to their former positions by the action of the spring $j^2$, the connected arm $a^2$ striking against the stop $s^6$. The pawls $r$ will thus be raised out of the ratchet-teeth of the disk I, as shown in Fig. 1, so as to allow the feeding-roll D and the feeding-belt C to bring forward a fresh supply of loose tobacco and force the same into the measuring-chamber $q'$, to form a new bunch-filler. The measured filler having been deposited in the receiving-pocket $h^5$ and the chamber $q'$ brought back to its receiving position, as above described, the continued rotation of the cam-shaft O and the cam F' will cause the forward movement of the roller $t^3$ and the simultaneous backward movement of the bed $k^3$, and the bunch-binder, which is to be placed upon that portion of the belt C which is above the said bed $k^3$, will be rolled upon the filler to form the completed cigar-bunch; but as the roll $t^3$ starts forward the action of the cam D' upon the belt-drum $j^3$ will be such as to draw upon that end of the belt, and so cause the rolling-pocket of the belt to be gradually contracted, thus serving to wind the binder upon the filler very tightly and producing a desirable bunch for working with cigar-wrapping machines. When the binder has been completely wound upon the bunch by the above-mentioned movement of the operating mechanism, the rolling pocket of the belt will be drawn out by the continued movement of the roll $t^3$ after the bed $k^3$ has been brought up against its limiting-stop $i^4$, thus causing the connecting-rod $c^4$ to rise in the slot $y^2$ of the arm $d^4$, as shown in Fig. 14, so that the rolled cigar-bunch will be discharged into the carrier G' and will be prevented from dropping through the said carrier by the stationary flat tongue $j^5$, which is secured to the carrier-guide H'. When the bunch has been deposited in the carrier and is held upon the tongue $j^5$, the continued movement of the cam-shaft O and the cam I will cause the movement of the lever $p^4$ away from contact with the arm $x^4$, thus allowing the plate $g^4$ to be pressed forward against the cigar-bunch by means of the springs $j^4$ $j^4$, so that when the carrier is moved away from the tongue $j^5$ the bunch will be firmly held by the pressure of the said plate, and when the carrier has been brought to the extreme of its movement the downward movement of the forcer $k^5$ by means of the roller $l^5$ upon the side of the cam W and the projecting cam $m^5$ upon the arm $n^5$ of the bell-crank lever J' will cause the finished cigar-bunch to be forced downward and be discharged from the carrier.

It is of course to be understood that I do not limit my invention to the employment of a spur roll for feeding the tobacco through the throat-passage for the reason that a pair of opposite feeding-rolls or other devices may be employed, as in various cigar-bunch machines heretofore constructed, the said devices being positively driven by the power transmitted through the friction-clutch, so that the friction-clutch will only be caused to slip upon the engagement of the stop-pawl with the periphery of the engaging-wheel or other member, which is a different action from that heretofore obtained by the employment of a friction-clutch with the feeding device of a cigar-machine.

It is also to be understood that a single pawl may be used instead of the several graduated pawls when the teeth of the disk I are made sufficiently fine to cause the stopping of the feed-roll with the required degree of precision, and that the well-known friction pawl or clamp may be employed instead of the pawl $r^2$ when the disk I is made without the teeth $r$, or that any other suitable form of stopping device which will effect the prompt disconnection of the friction-joint may be employed.

I claim as my invention—

1. In combination, a yielding presser adapted to press upon the filler being measured, a friction-clutch, mechanism for feeding the fillers against said yielding presser by power transmitted through said friction-clutch, and a stop operatively connected with the said yielding presser, and adapted to engage with one member of the friction-clutch to stop the feed upon the proper movement of the yielding presser, substantially as described.

2. In combination, a yielding presser adapted to press upon the filler being measured, a friction-clutch, mechanism for feeding the fillers against said yielding presser by power transmitted through said friction-clutch, and a stop operatively connected with the said yielding presser and adapted to engage with one member of the friction-clutch to stop the feed upon the proper movement of the yielding presser, and also operatively connected with the driving mechanism to cause the release of the engaged member of the friction-clutch upon the continued movement of the machine, substantially as described.

3. In combination, a yielding presser adapted to press upon the filler being measured, a friction-clutch, mechanism for feeding the fillers against said yielding presser by power transmitted through said friction-clutch, a stop operatively connected with the said yielding presser and adapted to engage with one member of the friction-clutch to stop the feed upon the proper movement of the yielding presser, and means for adjusting the pressure of the yielding presser upon the filler, substantially as described.

4. In combination, a yielding presser adapted to press upon the filler being measured, a friction-clutch, mechanism for feeding the fillers against the said yielding presser by power transmitted through said friction-clutch, a stop operatively connected with the said yielding presser and adapted to engage with one member of the friction-clutch to stop the feed upon the proper movement of the yielding presser, and means for adjusting the movement of the yielding presser, substantially as described.

5. In combination, the throat-passage and means for feeding tobacco through the same, the knife or gate, the measuring-chamber, the chamber-carrying slide, the supplementary slide attached thereto, the yielding back plate of the measuring-chamber, means for connecting the said back plate with the supplementary slide, the limiting-stop to the downward movement of the outer portion of the chamber-piece with the chamber-carrying slide, and mechanism for first operating the knife or gate to cut off the quantity of tobacco in the measuring-chamber, then conjointly moving the measuring-chamber and knife or gate toward the required point for depositing the filler, and also causing the required movement of the supplementary slide to expel the filler from the measuring-chamber, substantially as described.

6. In combination, the rolling belt attached at one end to the reciprocated bed, the oppositely-reciprocated bed and roller, and means for drawing upon the opposite end of the said belt to cause the contraction of the rolling pocket toward the completion of the bunch, substantially as described.

7. In combination, the rolling belt and means for operating the same, the sliding carrier provided with a spring-operated holding-plate, the mechanism for causing the backward movement of said plate against the action of the springs, the fixed tongue for preventing the bunch from passing through the carrier, means for reciprocating the carrier, and the forcer for pressing the completed bunch out of the carrier, substantially as described.

RICHARD A. BRIGHT.

Witnesses:
WALTER A. PECK,
SOCRATES SCHOLFIELD.